(12) United States Patent
Takaku

(10) Patent No.: US 9,979,277 B2
(45) Date of Patent: May 22, 2018

(54) PWM CONTROL DEVICE AND THREE-LEVEL POWER CONVERSION DEVICE USING PWM CONTROL DEVICE

(71) Applicant: FUJI ELECTRIC CO., LTD., Kawasaki-shi, Kanagawa (JP)

(72) Inventor: Taku Takaku, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days. days.

(21) Appl. No.: 15/450,901

(22) Filed: Mar. 6, 2017

(65) Prior Publication Data

US 2017/0271995 A1 Sep. 21, 2017

(30) Foreign Application Priority Data

Mar. 17, 2016 (JP) ................ 2016-054144

(51) Int. Cl.
| H02M 1/12 | (2006.01) |
| H02M 1/38 | (2007.01) |
| H02M 7/483 | (2007.01) |
| H02M 7/5395 | (2006.01) |

(52) U.S. Cl.
CPC .......... H02M 1/38 (2013.01); H02M 7/483 (2013.01); H02M 7/5395 (2013.01)

(58) Field of Classification Search
CPC .... H02M 7/483; H02M 7/487; H02M 7/5395; H02M 7/48; H02M 7/525; H02M 7/527; H02M 7/529; H02M 7/53871; H02M 7/53873

USPC ............ 363/40, 41, 95, 96, 97, 98, 131, 132
See application file for complete search history.

(56) References Cited

U.S. PATENT DOCUMENTS

| 2003/0137857 | A1* | 7/2003 | Yamanaka | H02M 7/483 363/132 |
| 2012/0155124 | A1* | 6/2012 | Cheng | H02M 3/337 363/24 |
| 2013/0193762 | A1 | 8/2013 | Fujii et al. | |
| 2014/0139159 | A1 | 5/2014 | Sato | |
| 2015/0311800 | A1 | 10/2015 | Katayama et al. | |
| 2017/0085125 | A1* | 3/2017 | Ghosh | H02M 7/487 |

FOREIGN PATENT DOCUMENTS

| JP | 2006-109541 A | 4/2006 |
| JP | 2013-158093 A | 8/2013 |
| JP | 2014-103748 A | 6/2014 |
| JP | 2015-211595 A | 11/2015 |

* cited by examiner

Primary Examiner — Alex Torres-Rivera
(74) Attorney, Agent, or Firm — Rabin & Berdo, P.C.

(57) ABSTRACT

A pulse width modulation (PWM) control device for converting a first PWM signal for a two-level power conversion device to a second PWM signal for a three-level power conversion device, the three-level power conversion device including a switch, the second PWM signal driving the switch through a drive unit. The PWM control device includes an input terminal for receiving the first PWM signal for the two-level power conversion device, a conversion unit configured to convert the first PWM signal into the second PWM signal for the three-level power conversion device, and an output unit that outputs the second PWM signal to the drive unit.

9 Claims, 9 Drawing Sheets

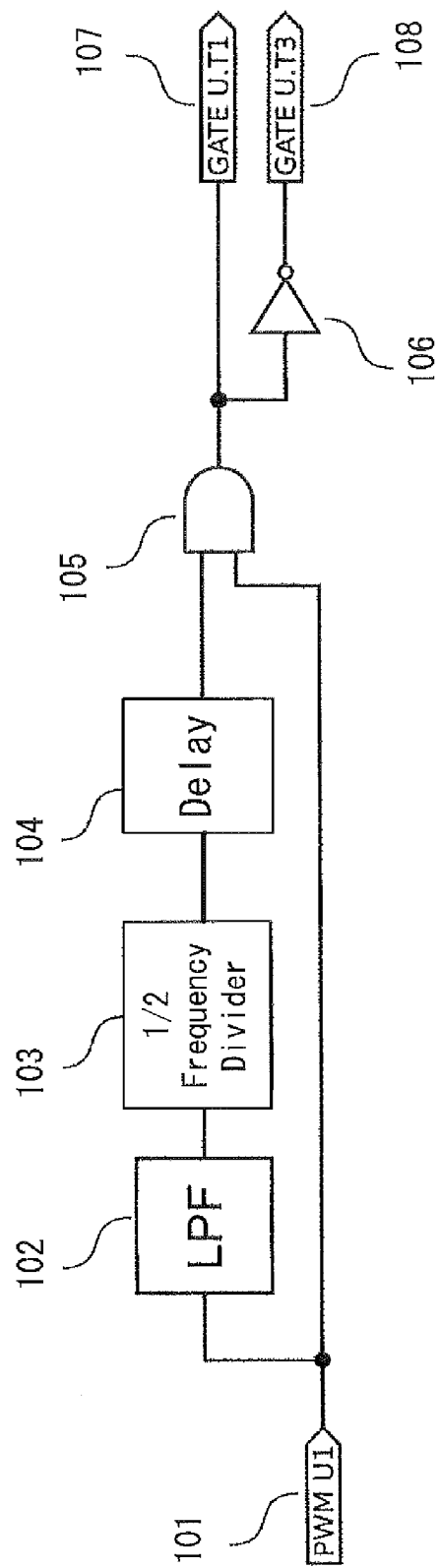
F I G. 1

—RELATED ART—

-RELATED ART-

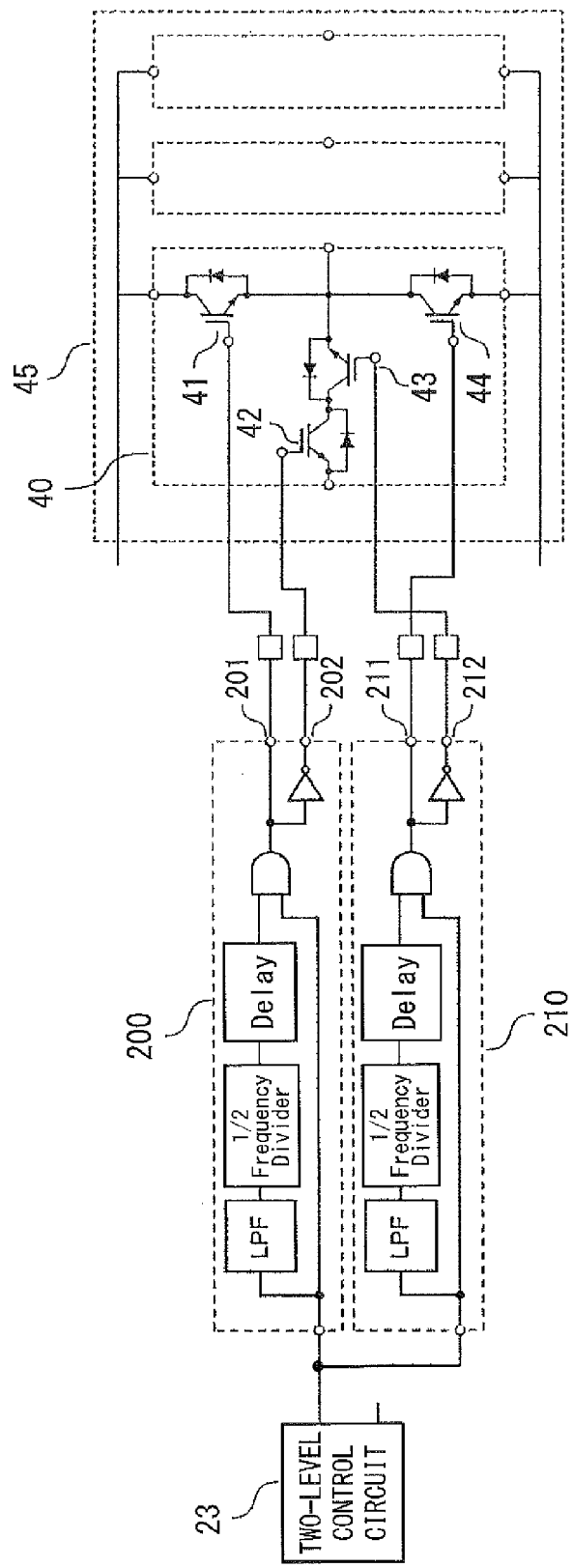
F I G. 5

PWM CONTROL DEVICE AND THREE-LEVEL POWER CONVERSION DEVICE USING PWM CONTROL DEVICE

CROSS-REFERENCE TO RELATED APPLICATIONS

This application is based upon and claims the benefit of priority of the prior Japanese Patent Application No. 2016-054144, filed on Mar. 17, 2016, the entire contents of which are incorporated herein by reference.

TECHNICAL FIELD

The present invention relates to a PWM (Pulse Width Modulation) control device for a three-level power conversion device, in particular, a technology for configuring the PWM control device for the three-level power conversion device by adding a circuit that receives an output of a two-level control circuit that outputs a PWM signal for a two-level power conversion device, to the two-level control circuit.

BACKGROUND

As a circuit system that generates a PWM signal used in a three-level power conversion device, a control circuit for a power conversion device that specializes in the three-level power conversion device and that realizes a PWM control system is known, for example, as described in the patent documents described below.

Japanese Laid-Open Patent Publication No. 2006-109541 discloses a control circuit for a power converter that realizes a PWM control system in which a high-speed current control response can be made, and in which harmonics can be suppressed and a switching frequency does not change significantly, in a three-level converter.

Japanese Laid-Open Patent Publication No. 2013-158093 discloses a three-level inverter in which control means for controlling each of three phases, U, V, and W, performs PWM processing by using a modulation signal λ from modulation signal generation means and a carrier signal from carrier signal generation means so as to generate a control signal that controls switching elements T1 to T4 of a switching leg of each of the phases.

Japanese Laid-Open Patent Publication No. 2014-103748 (see, for example, paragraph 0029 and FIG. 1 therein) discloses a control circuit of a power conversion device that specializes in a multilevel inverter of three or more levels, and that realizes a PWM control system, and further discloses that a control unit for power conversion is configured by an application specific integrated circuit (ASIC) or the like.

The patent documents above disclose a PWM control device that principally specializes in a three-level power conversion device. However, a PWM control device for a two-level power conversion device and a PWM control device for a three-level power conversion device are not compatible with each other, and therefore a PWM control device (a PWM signal generation device) may be individually prepared for each of the PWM control devices.

SUMMARY

A PWM control device according to an embodiment, the PWM control device incorporating a control signal generation circuit that drives a semiconductor element that configures a three-level power conversion device, includes: a two-level control circuit that outputs a PWM signal for a two-level power conversion device; a conversion unit that converts the PWM signal that is output from the two-level control circuit into a PWM signal for the three-level power conversion device; and an output unit that outputs the converted PWM signal for the three-level power conversion device to a drive unit that drives a switch of the three-level power conversion device.

In a three-level power conversion device using the PWM control device according to an embodiment, two sets of the PWM control devices are prepared in advance, the PWM signal that is output from the two-level control circuit is input to an input unit of each of the prepared two sets of the PWM control devices, a signal that is output from an output unit of each of the two sets of the PWM control devices is input to gates of four semiconductor switches via the drive units of the respective four semiconductor switches, the four semiconductor switches configuring an upper arm and a lower arm of a main circuit of the three-level power conversion device, or configuring the upper arm, the lower arm, and reverse blocking switches, and an AC (Alternating Current) signal is obtained from an output unit of the main circuit of the three-level power conversion device.

BRIEF DESCRIPTION OF DRAWINGS

FIG. 1 is a circuit block diagram illustrating a minimum configuration of a circuit that converts a PWM signal for a two-level power conversion device into a PWM signal for a three-level power conversion device, according to an embodiment of the present invention;

FIG. 5 is a second block diagram illustrating the configuration of a three-level power conversion device, which includes a circuit that converts a PWM signal for a two-level power conversion device into a PWM signal for a three-level power conversion device, according to the embodiment of the present invention;

8 by using a three-level power conversion device according to the embodiment of the present invention.

DESCRIPTION OF EMBODIMENTS

An embodiment of the present invention is described below in detail.

Figure 2:
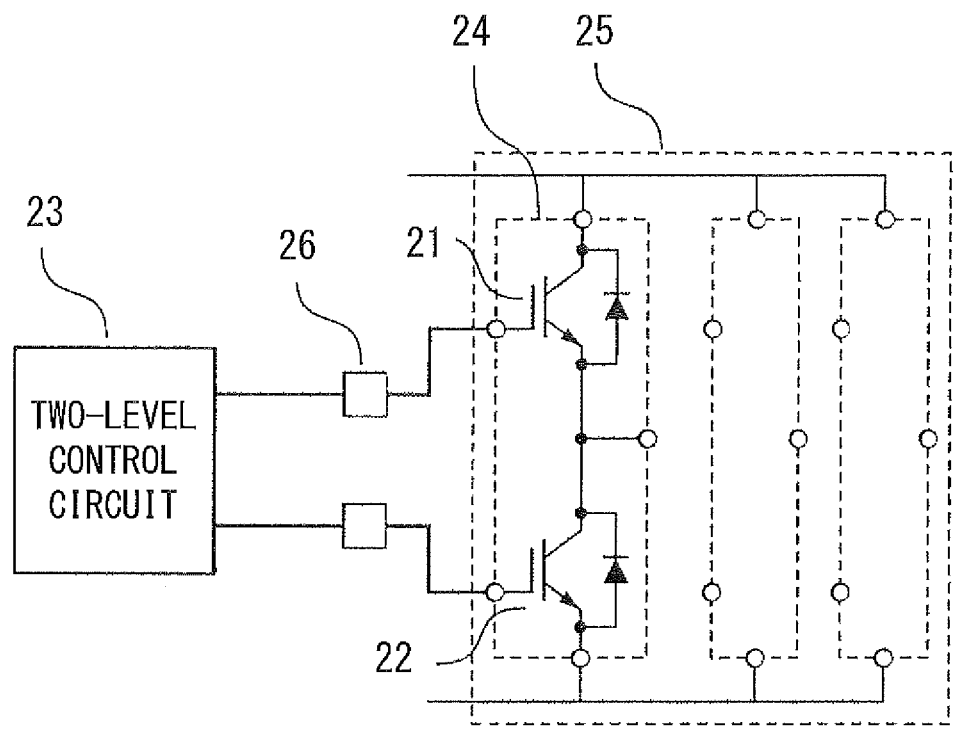
FIG. 2 illustrates the configuration of a main circuit 25 of a two-level power conversion device in related art.

FIG. 1 is a circuit block diagram illustrating a minimum configuration of a circuit that converts a PWM signal for a two-level power conversion device into a PWM signal for a three-level power conversion device, according to the embodiment of the present invention, and FIG. 2 illustrates the configuration of a main circuit 25 of a two-level power conversion device in related art.

In FIG. 1, a PWM signal (illustrated in FIG. 2 as a signal for a U-phase) that is output from a two-level control circuit 23 (see FIG. 2) is input to an input unit 101 (i.e., an input terminal). A high-frequency component is removed from the signal input to the input unit 101 by using a low pass filter 102 such that a signal including only a fundamental wave component is obtained, and the obtained signal is input to a frequency divider circuit (a ½ frequency divider) 103 on a post stage.

The signal including only the fundamental wave component is binarized by using a threshold of an input terminal of the frequency divider circuit 103 in the frequency divider circuit 103, the frequency of the signal is halved, and the signal is further converted into a signal for which a phase is shifted by a delay circuit 104 on the next stage.

An output signal of the delay circuit 104 and the signal input to the input unit 101 are input to an AND circuit 105. One signal that is branched from an output of the AND circuit 105 is output from an output unit 107 (i.e., an output terminal) as a (first) output signal (for example, a drive signal of a semiconductor switch T1 of an upper arm of a U-phase), and the other signal that is branched from the output of the AND circuit 105 is output from an output unit 108 (i.e., an output terminal) via a NOT circuit 106 as a (second) output signal (for example, a drive signal of a semiconductor switch T3 of a lower arm of the U-phase). The AND circuit 105 and the NOT circuit 106 configure (i.e., constitute) a branching circuit, and the branching circuit configures an output unit of a PWM control device of a three-level power conversion device.

Semiconductor switches in a switching leg of each phase that configures a main circuit of the three-level power conversion device are usually referred to as T1 to T4 from the top in many cases.

As illustrated in FIG. 2, in a two-level power conversion device, PWM signals that are output from a two-level control circuit 23 are input, for example, to gates of a semiconductor switch 21 and a semiconductor switch 22 that configure a switching leg 24 of a U-phase of the two-level power conversion device, via a switch drive circuit 26. The switching leg above is also prepared for each of a V-phase and a W-phase such that a three-phase two-level power conversion device is configured. The signals that are input to the gates of the semiconductor switch 21 and the semiconductor switch 22 are mutually inverted in such a way that the two semiconductor switches are not in the ON state simultaneously. As the signals are mutually inverted, a difference in a phase between both of the signals is 180 degrees.

Figure 3:
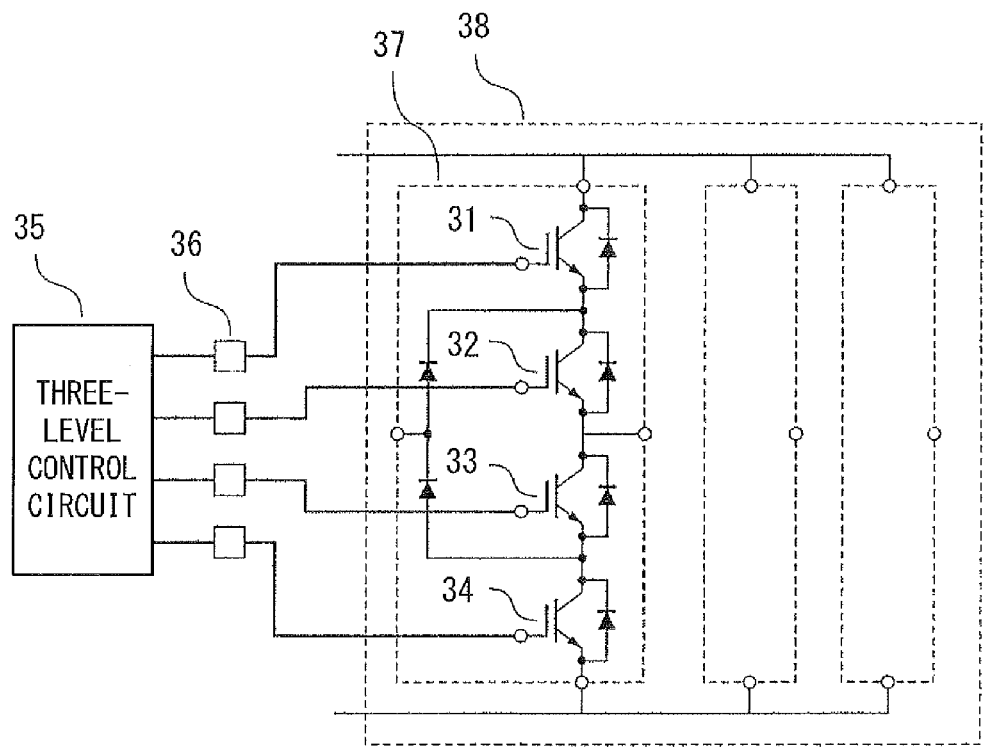
FIG. 3 illustrates the configuration of a main circuit 38 of a three-level power conversion device in related art.

FIG. 3 illustrates the configuration of a main circuit 38 of a three-level power conversion device in related prior art. In FIG. 3, semiconductor switches 31 to 34 configure a switching leg for a U-phase, and the switching leg is further prepared for a V-phase and a W-phase such that a three-phase three-level power conversion device is configured.

PWM signals generated by a three-level control circuit 35 illustrated in FIG. 3 are input, for example, to gates of the semiconductor switches 31 to 34 that configure the switching leg for the U-phase via switch drive circuits 36 that drive the semiconductor switches of the U-phase. A series circuit that is configured of two diodes is connected between a connection point of the semiconductor switches 31 and 32 and a connection point of the semiconductor switches 32 and 33, and an intermediate voltage of three levels of voltages is connected to a connection point of the two diodes. In the configuration above, when the semiconductor switches 31 and 32 are in the ON state and the semiconductor switches 33 and 34 are in the OFF state, a high voltage is output from the switching leg, and when the semiconductor switches 31 and 32 are in the OFF state and the semiconductor switches 33 and 34 are in the ON state, a low voltage is output from the switching leg. When the semiconductor switches 31 and 34 are in the OFF state and the semiconductor switches 32 and 33 are in the ON state, an intermediate voltage is output from the switching leg.

Figure 4:
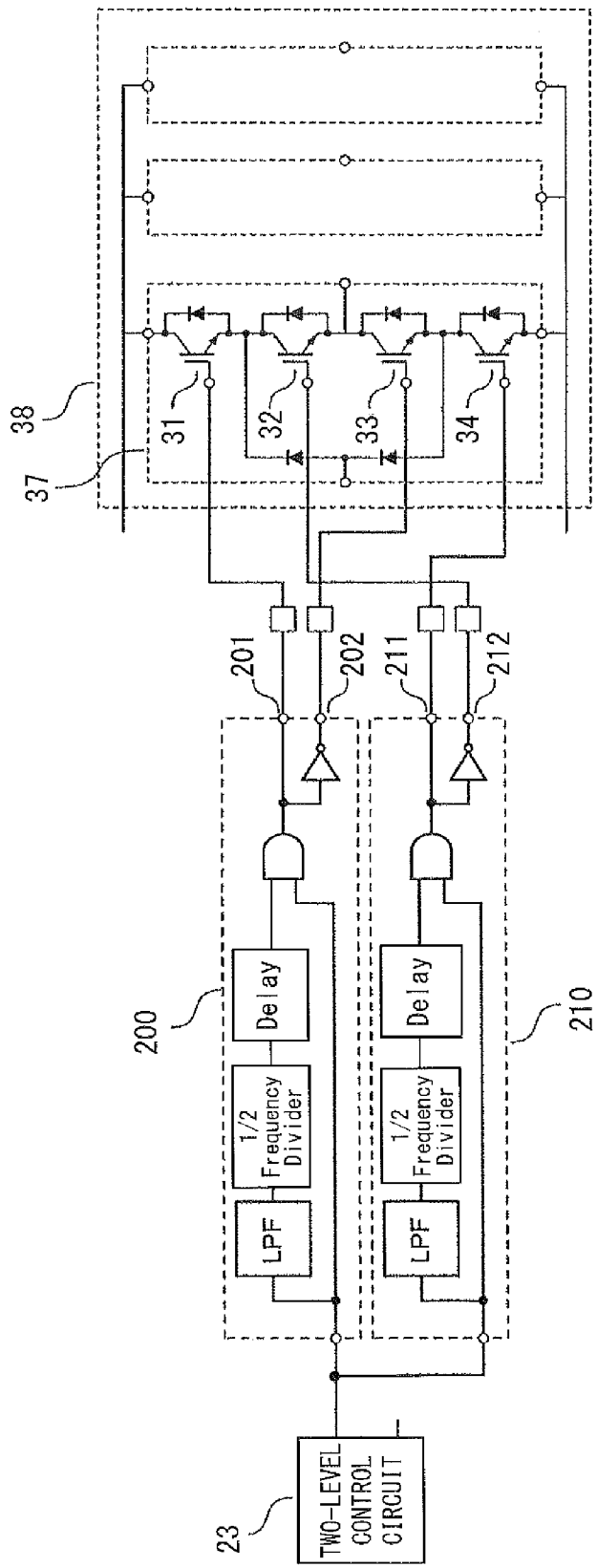
FIG. 4 is a first block diagram illustrating the configuration of a three-level power conversion device, which includes a circuit that converts a PWM signal for a two-level power conversion device into a PWM signal for a three-level power conversion device, according to the embodiment of the present invention.

FIG. 4 is a first block diagram illustrating the configuration of a three-level power conversion device that includes a circuit that converts a PWM signal for a two-level power conversion device into a PWM signal for a three-level power conversion device, according to the embodiment of the present invention. A two-level control circuit 23 and PWM signal conversion circuits 200 and 210 configure a PWM control device of the three-level power conversion device (the same hereinafter).

In FIG. 4, a signal for an upper arm of a two-level power conversion device that is output from the two-level control circuit 23 for the two-level power conversion device is input to the PWM signal conversion circuits 200 and 210, an output signal 201 that is output from the PWM signal conversion circuit 200 is input to a gate of a semiconductor switch 31 that configures an upper arm of a U-phase, via a switch drive circuit, and an output signal 202 that is output from the PWM signal conversion circuit 200 is input to a gate of a semiconductor switch 33 that configures a lower arm of the U-phase, via a switch drive circuit. A difference of a half cycle of an output signal of a PWM signal conversion circuit (one cycle of a fundamental wave that is output from a low pass filter 102) is set as delay amounts of both of delay circuits 104 that respectively configure the PWM signal conversion circuits 200 and 210. In addition, an output signal 211 that is output from the PWM signal conversion circuit 210 is input to a gate of a semiconductor switch 34 that configures the lower arm of the U-phase, via a switch drive circuit, and an output signal 212 that is output from the PWM signal conversion circuit 210 is input to a gate of a semiconductor switch 32 that configures the upper arm of the U-phase, via a switch drive circuit. Consequently, a main circuit 37 (a switching leg) for the U-phase of a three-phase three-level power conversion device is realized.

The configuration above is also prepared for each of a V-phase and a W-phase of three phases such that a main circuit 38 of the three-phase three-level power conversion device is configured.

FIG. 5 is a second block diagram illustrating the configuration of a three-level power conversion device that includes a circuit that converts a PWM signal for a two-level power conversion device into a PWM signal for a three-level power conversion device, according to the embodiment of the present invention. Namely, FIG. 5 illustrates an example in which the main circuit (the switching leg) for the U-phase of the three-level power conversion device of FIG. 4 is applied to a T-type circuit that is configured by semiconductor switches 41 to 44, and this configuration is also prepared for each of a V-phase and a W-phase of three phases such that a main circuit 45 of a three-level power conversion device is realized.

In FIG. 5, the configurations of a two-level control circuit 23 and PWM signal conversion circuits 200 and 210 in a two-level power conversion device are the same as those in FIG. 4. In this case, an output signal 201 that is output from the PWM signal conversion circuit 200 is input to the semiconductor switch 41 that configures an upper arm of the U-phase, via a switch drive circuit, and an output signal 202 that is output from the PWM signal conversion circuit 200 is input to the semiconductor switch 42 that connects an intermediate point of the upper and lower arms of the U-phase to an intermediate voltage, via a switch drive circuit.

In addition, an output signal 211 that is output from the PWM signal conversion circuit 210 is input to the semiconductor switch 44 that configures the lower arm of the U-phase, via a switch drive circuit, and an output signal 212 that is output from the PWM signal conversion circuit 210 is input to the semiconductor switch 43 that connects the intermediate point of the upper and lower arms of the U-phase to the intermediate voltage, via a switch drive circuit. Consequently, a main circuit 40 for the U-phase of a three-phase three-level power conversion device is realized. The semiconductor switches 42 and 43 configure a switch circuit that connects the intermediate point of the upper and lower arms (this is also a connection point of the semiconductor switches 41 and 42 and an output unit) to an intermediate voltage of three levels of voltages. When the semiconductor switches 41 and 42 are in the OFF state and the switch circuit above is in the ON state, the intermediate voltage is output from the U-phase.

The configuration above is also prepared for the V-phase and the W-phase of the three phases such that the three-phase three-level power conversion device is configured.

Figure 6:
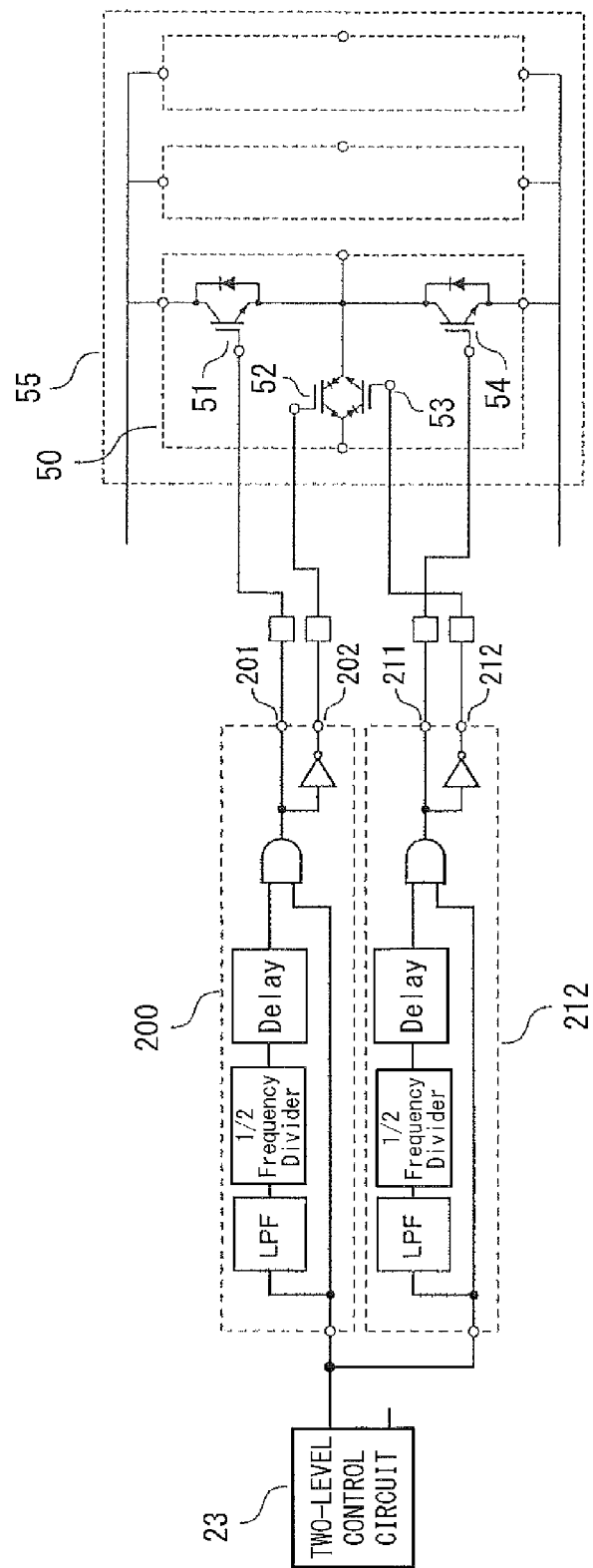
FIG. 6 is a third block diagram illustrating the configuration of a three-level power conversion device, which includes a circuit that converts a PWM signal for a two-level power conversion device into a PWM signal for a three-level power conversion device, according to the embodiment of the present invention.

FIG. 6 is a third block diagram illustrating the configuration of a three-level power conversion device that includes a circuit that converts a PWM signal for a two-level power conversion device into a PWM signal for a three-level power conversion device, according to the embodiment of the present invention. Namely, FIG. 6 illustrates an example in which the main circuit for the U-phase of the three-level power conversion device of FIG. 4 is applied to a T-type circuit that is configured by semiconductor switches 51 to 54, and this configuration is also prepared for each of a V-phase and a W-phase of three phases such that a three-level power conversion device is realized. The semiconductor switches 52 and 53 are reverse blocking semiconductor switches.

In FIG. 6, the configurations of a two-level control circuit 23 and PWM signal conversion circuits 200 and 210 in a two-level power conversion device are the same as those in FIG. 4. In this case, an output signal 201 that is output from the PWM signal conversion circuit 200 is input to the semiconductor switch 51 that configures an upper arm of the U-phase, via a switch drive circuit, and an output signal 202 that is output from the PWM signal conversion circuit 200 is input to the semiconductor switch 52 that connects an intermediate point of the upper and lower arms of the U-phase to an intermediate voltage, via a switch drive circuit.

In addition, an output signal 211 that is output from the PWM signal conversion circuit 210 is input to the semiconductor switch 54 that configures the lower arm of the U-phase, via a switch drive circuit, and an output signal 212 that is output from the PWM signal conversion circuit 210 is input to the semiconductor switch 53 that connects the intermediate point of the upper and lower arms of the U-phase to the intermediate voltage, via a switch drive circuit. Consequently, a main circuit (a switching leg) 50 for the U-phase of a three-phase three-level power conversion device is realized. The semiconductor switches 52 and 53 configure a switch circuit that connects the intermediate point of the upper and lower arms (this is also a connection point of the semiconductor switches 51 and 52 and an output circuit) to an intermediate voltage of three levels of voltages. When the semiconductor switches 51 and 52 are in the OFF state and the switch circuit above is in the ON state, the intermediate voltage is output from the U-phase.

The configuration above is also prepared for each of a V-phase and a W-phase of three phases such that a main circuit of a two-phase three-level power conversion device is configured.

Figure 7:
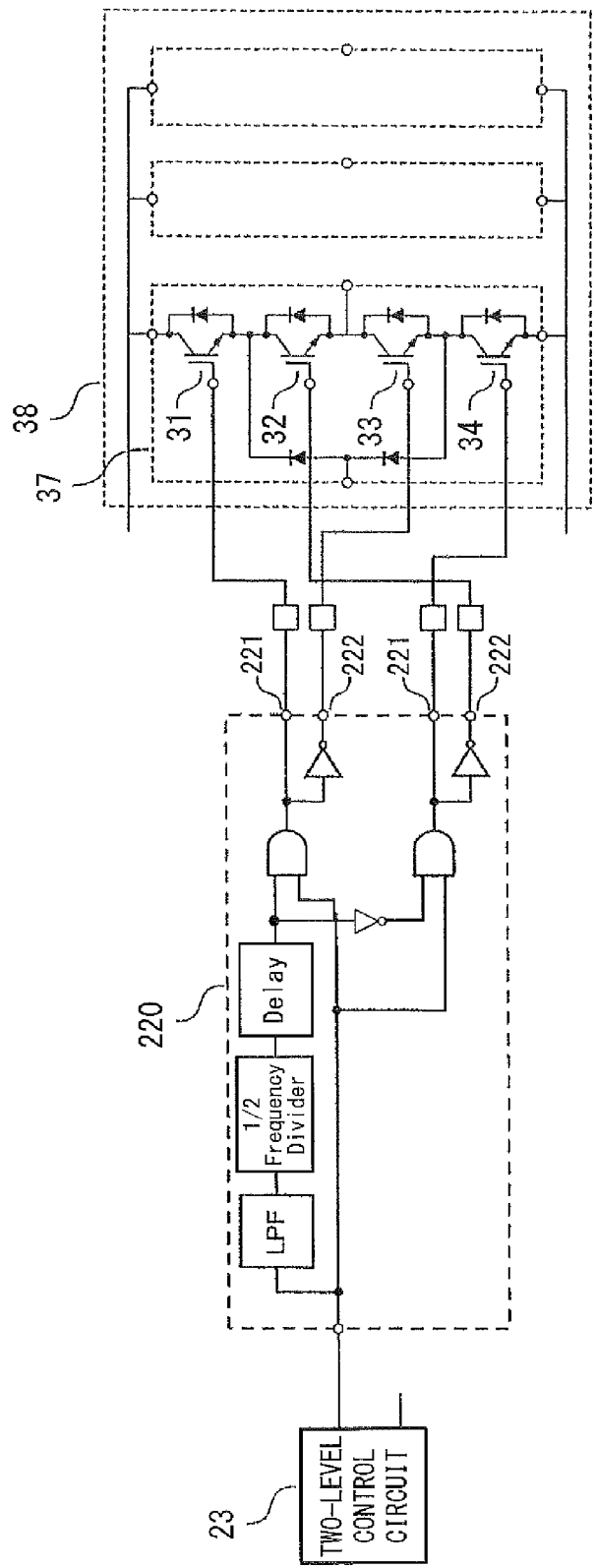
FIG. 7 illustrates a variation of the circuit illustrated in FIG. 4 that converts a PWM signal for a two-level power conversion device into a PWM signal for a three-level power conversion device, according to the embodiment of the present invention.

FIG. 7 illustrates a variation of the circuit illustrated in FIG. 4 that converts a PWM signal for a two-level power conversion device into a PWM signal for a three-level power conversion device, according to the embodiment of the present invention. Namely, FIG. 7 illustrates an exemplary configuration in which the PWM signal conversion circuits 200 and 210 illustrated in FIG. 4 are transformed.

In FIG. 7, a variation 220 of a PWM signal conversion circuit is configured by adding another pair of the AND circuit and the NOT circuit in the PWM signal conversion circuit 200 illustrated in FIG. 4 and adding a NOT circuit to one (a side that is connected to an output of a delay circuit 104) of the input units of the added AND circuit. The operation of the variation 200 is the same as the operation in FIG. 4, and could be easily understand by those skilled in the art. Therefore, the description thereof is omitted. A two-level control circuit 23 and a PWM signal conversion circuit 220 configure a PWM control device of a three-level power conversion device.

Figure 8:
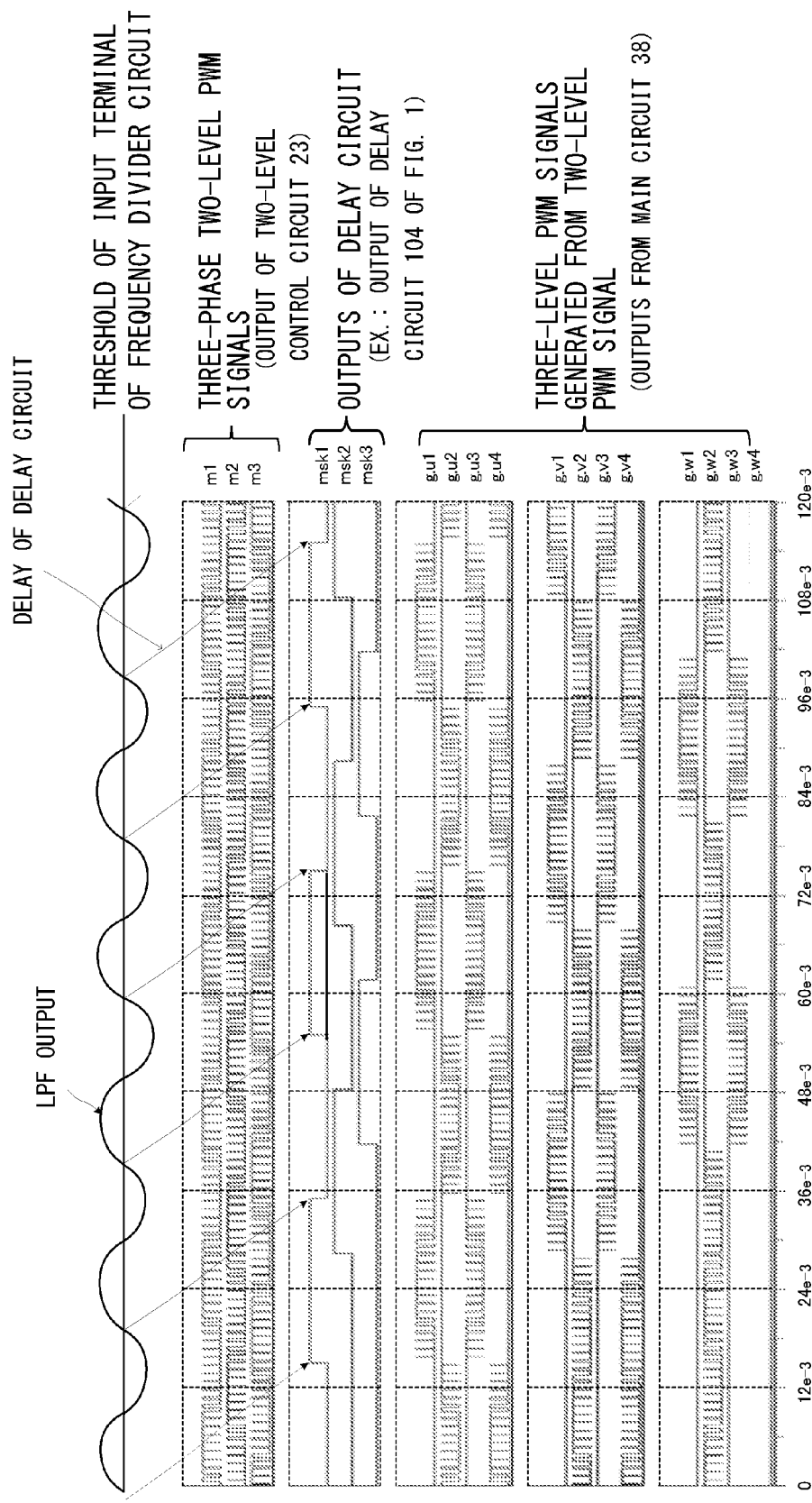
FIG. 8 is a waveform chart that is obtained in circuit simulation performed to explain an effect of a PWM control device according to the embodiment of the present invention.

FIG. 8 is a waveform chart that is obtained in circuit simulation performed to explain an effect of a PWM control device according to the embodiment of the present invention. The PWM signal conversion circuits 200 and 210 of FIGS. 4 to 6 are target circuits in this simulation. Three waveforms of a group illustrated in the second portion from the top in FIG. 8 indicate PWM signals for the upper arms of the U-phase, the V-phase, and the W-phase that are respectively obtained from the two-level control circuit 23 (signals for the lower arms are obtained by inverting the signals illustrated in FIG. 8). A waveform of an output signal of the low pass filter 102 in the U-phase is illustrated in the uppermost portion of FIG. 8, together with a straight line indicating a threshold of an input terminal of the delay circuit 104. The output signal of the low pass filter 102 is binarized by using the threshold of the input terminal, and the frequency of the output signal is halved in the frequency divider circuit 103, and the obtained signal is further delayed by a prescribed time in the delay circuit 104 on the next stage such that obtained signal is converted into a signal for which a phase is shifted. A group in the third portion of FIG. 8 indicates output signals of the delay circuit 104. Three signals illustrated in the third portion of FIG. 8 are obtained from PWM signals for the upper arms of the U-phase, the V-phase, and the W-phase that are respectively obtained from the two-level control circuit 23.

Groups illustrated in the third, fourth, and fifth portions of FIG. 8 indicate drive signals for four switch elements (these correspond to the switch elements 31 to 34 of FIG. 4) of each of the U-phase, the V-phase, and the W-phase. Four signals indicated in each of the groups respectively correspond to the signals 201, 211, 202, and 212 illustrated in FIGS. 4 to 6 in order from the top. It can be confirmed that the waveforms of PWM signals that are input to the main circuit 38 of the three-level power conversion device illustrated in FIG. 4, for example, were obtained.

Figure 9:
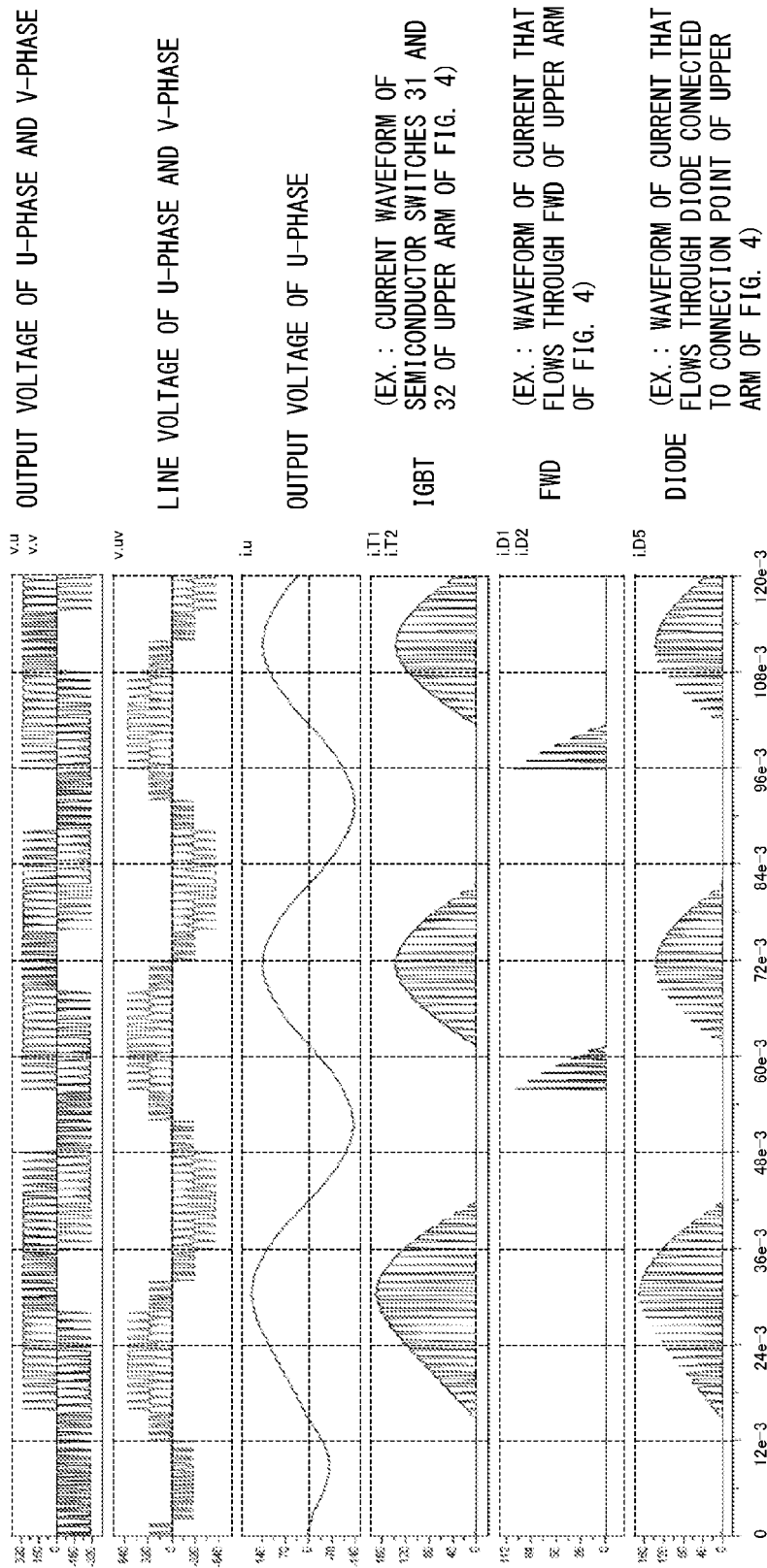
FIG. 9 is a waveform chart illustrating a result of circuit simulation to demonstrate a PWM signal observed in FIG.

FIG. 9 is a waveform chart illustrating a result of circuit simulation to demonstrate a PWM signal observed in FIG. 8 by using a three-level power conversion device according to the embodiment of the present invention.

As a circuit simulation result of FIG. 9 shows, as an example, a sine wave output (see the third from the top) is obtained as an output current waveform of the U-phase, and it can be confirmed that a signal that is equivalent to the signal of the conventional three-level control circuit illustrated in FIG. 3 was obtained, by referencing the circuit simulation result of FIG. 9. Therefore, it can be confirmed that a PWM signal for a three-level power conversion device was obtained by adding a circuit that converts a PWM signal for a two-level power conversion device into a PWM signal for a three-level power conversion device according to the present invention.

An operation for one of three phases, for example, the U-phase, has been described above, and description of the operations for the V-phase and the W-phase of the three phases has been omitted. However, those skilled in the art could easily understand that one two-level control circuit 23 can cope with the V-phase and the W-phase of the three phases.

In addition, the delay circuit 104 of each of the phases generates a signal that is shifted from each other by an amount that corresponds to 120 degrees of an output signal cycle of a PWM signal conversion circuit (it is assumed, for example, that phase delay amounts of the delay circuit 104 of the PWM signal conversion circuit 200 or 220 of FIGS. 4 to 7 for the U-phase, the V-phase, and the W-phase are respectively amounts that correspond to 0 degree, 120 degrees, and 240 degrees, and it is also assumed that phase delay amounts of the delay circuit 104 of the PWM signal conversion circuit 210 of FIGS. 4 to 6 for the U-phase, the V-phase, and the W-phase are respectively amounts that correspond to 180 degrees, 300 degrees, and 60 degrees).

The frequency or cycle of an output of each of the phases is a frequency obtained by halving the frequency of an output signal of the two-level control circuit 23, or a cycle obtained by doubling the cycle of the output signal. Accordingly, it can be understood that three levels of PWM signals are generated from two levels of PWM signals, as illustrated in the lower portion of FIG. 8.

In a case in which the two-level control circuit 23 above is provided in each of the U-phase, the V-phase, and the W-phase (namely, three two-level control circuits 23 in total are provided), the delay circuit 104 can be omitted.

As described above, according to an embodiment, an existing two-level control circuit that generates a PWM signal for a two-level power conversion device does not need to be changed, and a dedicated three-level control circuit that generates a PWM signal for a three-level power conversion device does not need to be generated additionally. A PWM control device for a three-level power conversion device can be realized by adding a circuit that converts an output of the existing two-level control circuit into a PWM signal for a three-level power conversion device, to the existing two-level control circuit.

Stated another way, a PWM signal for a two-level control circuit can be easily converted into a PWM signal for a three-level power conversion device only by adding a new circuit to the existing two-level control circuit.

The present invention is not limited to the embodiment above, and various improvements or variations can be made without departing from the gist of the present invention.

What is claimed is:

1. A pulse width modulation (PWM) control device for converting a first PWM signal for a two-level power conversion device to a second PWM signal for a three-level power conversion device, the three-level power conversion device including a switch that is drivable by the second PWM signal through a drive unit, the PWM control device comprising:
    an input terminal for receiving the first PWM signal for the two-level power conversion device;
    a conversion unit configured to convert the first PWM signal into the second PWM signal for the three-level power conversion device, the conversion unit including
        a low pass filter that filters the first PWM signal and extracts a fundamental wave of the first PWM signal,
        a frequency divider circuit that binarizes the fundamental wave, and halves a frequency of the fundamental wave, and
        a delay circuit that shifts a phase of the fundamental wave; and
    an output unit that outputs the second PWM signal to the drive unit.

2. The PWM control device according to claim 1, wherein the output unit includes:
    an AND circuit that performs an AND operation on an output signal of the delay circuit and the first PWM signal; and
    a branching circuit, which includes a NOT circuit that inverts an output signal of the AND circuit.

3. The PWM control device according to claim 2, wherein the drive unit further includes a first drive unit and a second drive unit, and
    the branching circuit is configured to output the output signal of the AND circuit and an output signal of the NOT circuit respectively to the first and second drive units.

4. A three-level power conversion device that receives a pulse width modulation (PWM) signal for a two-level power conversion device, comprising:
    a main circuit, including four semiconductor switches that form an upper arm and a lower arm;
    four drive units for respectively driving the four semiconductor switches; and
    first and second PWM control devices, each including
        an input terminal for receiving the PWM signal for the two-level power conversion device,
        a conversion unit, and
        an output unit, wherein
        the conversion unit converts the received PWM signal into a first PWM signal for the three-level power conversion device and a second PWM signal for the three-level power conversion device, which are outputted to the four drive units via the output units, and
        the conversion unit includes
            a low pass filter that filters the received PWM signal and extracts a fundamental wave of the received PWM signal;
            a frequency divider circuit that binarizes the fundamental wave, and halves a frequency of the fundamental wave; and a delay circuit that shifts a phase of the fundamental wave.

5. The three-level power conversion device according to claim 4, wherein
the main circuit has an intermediate-level input terminal and a terminal that connects the upper arm and the lower arm,
two of the four semiconductor switches are reverse blocking switches, which are connected in series or in parallel in an opposite direction between the intermediate-level input terminal and the terminal that connects the upper arm and the lower arm, and
the two reverse blocking switches receive the first and second PWM signals outputted from the output units of the first and second PWM control devices, respectively.

6. A power conversion device, comprising:
three of the three-level power conversion device of claim 4, wherein
the delay circuits in the three-level power conversion devices have such different delay amounts that phases of output signals of the three three-level power conversion devices are different from one another by 120 degrees.

7. A three-level power conversion device that receives a pulse width modulation (PWM) signal for a two-level power conversion device, comprising:
a main circuit, including four semiconductor switches that form an upper arm and a lower arm;
four drive units for respectively driving the four semiconductor switches; and
a PWM control device, including
an input terminal for receiving the PWM signal for the two-level power conversion device,
a conversion unit, including a delay circuit, configured to convert the received PWM signal into another PWM signal for the three-level power conversion device,
a first AND circuit configured to perform an AND operation on an output signal of the delay circuit and the received PWM signal,
a second AND circuit configured to perform an AND operation on an inverted signal of the output signal of the delay circuit and the received PWM signal,
a first branching circuit, which includes a first NOT circuit that inverts an output signal of the first AND circuit, and
a second branching circuit, which includes a second NOT circuit that inverts an output signal of the second AND circuit; wherein
the first branching circuit and the second branching circuit generate four output signals, which are inputted to the four semiconductor switches respectively via the four drive units.

8. The three-level power conversion device according to claim 7, wherein
the main circuit has an intermediate-level input terminal and a terminal that connects the upper and lower arms,
two of the four semiconductor switches are reverse blocking switches, which are connected in series or in parallel in an opposite direction between the intermediate-level input terminal and the terminal that connects the upper and lower arms, and
two of the four output signals of the first and second branching circuits are inputted respectively to the two reverse blocking switches.

9. A power conversion device, comprising:
three of the three-level power conversion device of claim 7, wherein
the delay circuits in the three-level power conversion devices have such different delay amounts that phases of output signals of the three three-level power conversion devices are different from one another by 120 degrees.

* * * * *